(12) United States Patent
Maillard et al.

(10) Patent No.: US 8,469,640 B2
(45) Date of Patent: Jun. 25, 2013

(54) PROCESSING MACHINE HAVING POSITIVE FEED AND PROCESSING METHOD

(75) Inventors: Sylvain Maillard, Nangis (FR); Edouard Da Palma, Boulogne Billancourt (FR)

(73) Assignee: Cooper Power Tools SAS, Ozior La Ferriere (FR)

( * ) Notice: Subject to any disclaimer, the term of this patent is extended or adjusted under 35 U.S.C. 154(b) by 1078 days.

(21) Appl. No.: 12/412,054

(22) Filed: Mar. 26, 2009

(65) Prior Publication Data
US 2009/0245955 A1    Oct. 1, 2009

(30) Foreign Application Priority Data
Mar. 27, 2008  (FR) ..................... 08 51982

(51) Int. Cl.
*B23B 35/00* (2006.01)
*B23B 47/04* (2006.01)
*B23B 47/18* (2006.01)

(52) U.S. Cl.
USPC ................. 408/1 R; 173/19; 408/10; 408/15; 408/138; 408/139; 408/141

(58) Field of Classification Search
USPC ........... 408/1 R, 8–12, 14–15, 101, 137–142; 173/19
See application file for complete search history.

(56) References Cited

U.S. PATENT DOCUMENTS

| | | | |
|---|---|---|---|
| 2,453,136 A | 11/1948 | Karweit et al. | |
| 3,003,372 A | 10/1961 | Findley | |
| 3,487,729 A | 1/1970 | Juhasz et al. | |
| 3,574,290 A | 4/1971 | Eckman | |
| 3,583,822 A | 6/1971 | Alexander et al. | |
| 3,679,320 A * | 7/1972 | Bohorquez et al. | 408/99 |
| 3,767,313 A | 10/1973 | Bohoroquez et al. | |
| 3,797,583 A | 3/1974 | Quackenbush | |
| 3,838,934 A | 10/1974 | Petroff | |
| 4,083,646 A | 4/1978 | Vindez | |
| 4,097,177 A * | 6/1978 | Close | 408/132 |
| 4,111,590 A | 9/1978 | Burkart et al. | |
| 4,123,188 A | 10/1978 | Deremo et al. | |
| 4,198,180 A * | 4/1980 | Schultz | 408/9 |
| 4,443,139 A | 4/1984 | Eash | |

(Continued)

FOREIGN PATENT DOCUMENTS
DE    19 58 412    5/1971
DE    24 36 340    3/1975

(Continued)

*Primary Examiner* — Daniel Howell
(74) *Attorney, Agent, or Firm* — King & Spalding LLP

(57) ABSTRACT

This machine includes a casing (2), a tool-holder spindle (4), a motor (6), a drive mechanism (12) having positive feed which mechanically connects the motor to the spindle and which includes a first drive member (32) for rotating the spindle, a second drive member (34) for driving the spindle in translation and which is screwed onto the spindle (4) in order to advance or return the spindle, and a clutch (36) having a return configuration which disengages the second member and the motor and an advance configuration which engages them. The clutch includes a rotary engagement member (44), a first key (48) which is movable between a position for connecting the rotary member to the motor and a position for disengaging the rotary member, and a second key (50) which is movable between a position for connecting the rotary member to the casing and a position for disengaging the rotary member.

21 Claims, 7 Drawing Sheets

U.S. PATENT DOCUMENTS

| | | | |
|---|---|---|---|
| 4,591,299 A | | 5/1986 | Eckman |
| 4,592,681 A | | 6/1986 | Pennison et al. |
| 4,612,998 A | | 9/1986 | Vindez |
| 4,648,756 A | * | 3/1987 | Alexander et al. ............... 408/9 |
| 4,681,490 A | | 7/1987 | Pennison et al. |
| 4,688,970 A | | 8/1987 | Eckman |
| 4,799,833 A | | 1/1989 | Pennison et al. |
| 4,822,215 A | | 4/1989 | Alexander |
| 4,850,753 A | | 7/1989 | Dudden |
| 4,854,786 A | | 8/1989 | Alexander et al. |
| 5,022,798 A | | 6/1991 | Eckman |
| 5,022,800 A | * | 6/1991 | Vindez ........................ 408/14 |
| 5,054,968 A | * | 10/1991 | Eckman ........................ 408/97 |
| 5,073,068 A | | 12/1991 | Jinkins et al. |
| 5,143,161 A | | 9/1992 | Vindez |
| 5,149,232 A | | 9/1992 | Eckman |
| 5,351,797 A | | 10/1994 | Lawson et al. |
| 6,193,447 B1 | | 2/2001 | Thames et al. |
| 6,196,772 B1 | | 3/2001 | Thames et al. |
| 6,261,033 B1 | | 7/2001 | Thames et al. |
| 6,371,701 B1 | | 4/2002 | Blankenship et al. |
| 7,510,024 B2 | | 3/2009 | Veres |
| 8,070,400 B2 | | 12/2011 | Busatta |
| 8,118,520 B2 | | 2/2012 | Hintze et al. |
| 2006/0018724 A1 | | 1/2006 | Oehninger et al. |
| 2008/0260485 A1 | | 10/2008 | Jaillon |
| 2009/0022555 A1 | | 1/2009 | Oehninger et al. |
| 2009/0074525 A1 | | 3/2009 | Jaillon |
| 2009/0245955 A1 | | 10/2009 | Maillard |

FOREIGN PATENT DOCUMENTS

| | | |
|---|---|---|
| DE | 37 42 725 | 7/1989 |
| EP | 1550780 | 1/2005 |
| FR | 2 829 952 | 3/2003 |

* cited by examiner

PROCESSING MACHINE HAVING POSITIVE FEED AND PROCESSING METHOD

STATEMENT OF RELATED PATENT APPLICATION

This non-provisional patent application claims priority under 35 U.S.C. §119 to French Patent Application No. 08 51982, titled Processing Machine Having Positive Feed and Processing Method, filed Mar. 27, 2008. This French application is hereby fully incorporated herein by reference.

FIELD OF THE INVENTION

The present invention relates to a processing machine having a positive feed mechanism. More specifically, the present invention relates to a positive feed processing machine having a clutch that reduces the rotational speed of the drive motor and spindle when the end of advance travel for the spindle is detected.

BACKGROUND OF THE INVENTION

The invention is used, for example, in pneumatic drilling machines which are used in aircraft construction.

A machine of the above-mentioned type is known, for example, from EP-A-1 618 978. The drive mechanism of such a machine is referred to as "having positive feed" in English (or "à avance mécanique" in French).

A single motor thus ensures, via the drive mechanism, that the spindle is rotated about the axis thereof and, at the same time, that it is advanced or returned by translation along the axis thereof.

Since the translation and rotation drives of the spindle are connected mechanically, the advance of the spindle per revolution is constant. In this manner, the variations in speed of the motor do not have any effect on the advance per revolution. The thickness of the chips formed therefore remains constant and promotes the surface quality and the precision of the holes which are drilled by such a machine.

Drilling some materials which are known to be difficult, in particular composite materials, sometimes necessitates high tool rotational speeds.

However, such a machine cannot be used at high speed, that is to say, for example, at 15,000 rpm, without encountering premature wear of the drive mechanism, or even breakage.

SUMMARY OF THE INVENTION

An object of the invention is to provide a machine of the above-mentioned type which operates at a high rotational speed and which is reliable.

To that end, the invention relates to a machine of the above-mentioned type, characterised in that the clutch comprises:
- a rotary engagement member which is connected in terms of rotation to the second drive member, the rotary engagement member being movable in terms of rotation about an axis relative to the casing;
- at least a first key which is movable relative to the rotary engagement member between a position for connecting the rotary member to the drive motor and a position for disengaging the rotary member; and
- at least a second key which is movable relative to the rotary engagement member between a position for connecting the rotary member to the casing and a position for disengaging the rotary member, the first key being in its connection position and the second key being in its disengagement position when the clutch is in its advance configuration for the spindle, the first key being in its disengagement position and the second key being in its connection position when the clutch is in its return configuration for the spindle.

According to specific embodiments, the machine comprises one or more of the following features taken in isolation or in accordance with any technically possible combination:
- the first key and/or the second key is/are fixedly joined to the rotary engagement member in terms of rotation;
- the first key and/or the second key is/are radially movable relative to the axis of rotation of the rotary engagement member between the connection position and the disengagement position thereof;
- the rotary engagement member is mounted so as to be fixed in terms of translation relative to the casing along the axis thereof;
- the second drive member is a pinion, the rotary engagement member being a pinion which is engaged with the second drive member, the drive mechanism comprising an input pinion which is engaged with an output pinion of the drive motor, the rotary engagement member being connected to the input pinion when the clutch is in the advance configuration thereof;
- the first drive member is a pinion which is engaged with the input pinion;
- the clutch comprises a push-member which is movable between an advance position, in which the push-member maintains the first key in the connection position thereof and disengages the second key, and a return position in which the push-member maintains the second key in the connection position thereof and disengages the first key;
- the first key and/or the second key is/are a ball which is received in a hole of the rotary engagement member;
- the machine comprises a device for controlling the drive motor and the clutch;
- the control device comprises a unit for detecting the end of advance travel of the spindle, the control device moving the clutch into the return configuration thereof when the end of advance travel of the spindle is detected;
- the control device brings about a reduction in the rotational speed of the drive motor when the end of advance travel of the spindle is detected;
- the control device is pneumatic, the drive motor being pneumatic;
- the control device comprises a pneumatic actuator for moving the push-member between the advance position and the return position thereof;
- the control device comprises a pneumatic valve for reducing the supply flow of the drive motor;
- the control device comprises a pneumatic circuit for controlling the flow reduction valve and the movement actuator, the circuit supplying the flow reduction valve upstream of the movement actuator in such a manner that the control device brings about a reduction in the supply flow of the drive motor before actuating the movement of the push-member as far as the return position thereof.

The invention also relates to a processing method, characterised in that it is carried out by means of a processing machine as defined above.

According to a specific embodiment, the method comprises a step for advancing the spindle, wherein the rotational speed of the spindle is $\geq 6000$ rpm, preferably $\geq 8000$ rpm, further preferably ≧10,000 rpm, further preferably ≧12,000 rpm, further preferably ≧14,000 rpm, further preferably ≧15,000 rpm.

BRIEF DESCRIPTION OF THE DRAWINGS

The invention will be better understood from a reading of the following description which is given purely by way of example and with reference to the appended drawings, in which.

DETAILED DESCRIPTION OF THE EXEMPLARY EMBODIMENTS

The terms "right", "left", "vertical", "horizontal", "lower", "upper", "top" and "bottom" are intended to be understood below in relation to the position of the machine in FIG. 1.

Figure 1:
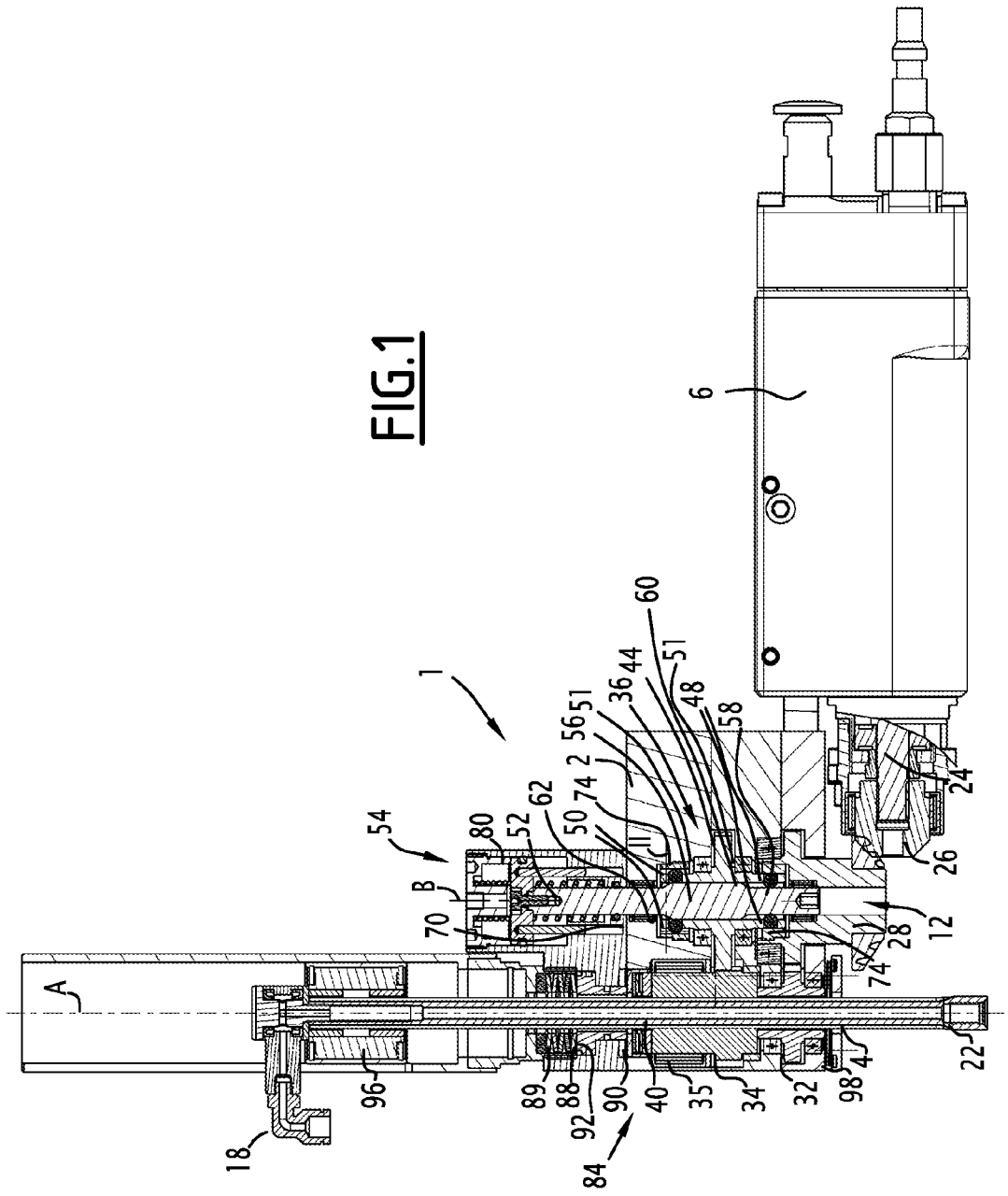
FIG. 1 is a schematic lateral section of a machine according to the invention.

FIG. 1 schematically illustrates a portable drilling machine 1 which mainly comprises:
- a casing 2;
- a tool-holder spindle 4 which extends along a vertical axis A;
- a drive motor 6 which is pneumatic in the example illustrated; and
- a drive mechanism 12 which is for driving the spindle 4 and which mechanically connects the spindle 4 to the motor 6.

The spindle 4 is received in the casing 2 so as to be movable in rotation about the axis A thereof and in translation along that axis A. The casing 2 is provided with a lubrication system 18.

In order to be able to drill holes, a drilling tool in the form of a drill bit is, for example, mounted in a removable manner at the lower end 22 of the drill 4. The lubrication system 18 allows lubrication of the edge of the tool during the processing operation.

The output shaft 24 of the motor 6 carries a conical output pinion 26 which engages with a conical input pinion 28 which has an axis B and which belongs to the drive mechanism 12. In the embodiment illustrated, the motor 6 is arranged substantially at right-angles relative to the spindle 4. However, it could be substantially parallel therewith, as set out, for example, in document FR-2 829 952.

As illustrated in FIG. 1, the drive mechanism 12 comprises, in addition to the conical input pinion 28, the following elements so that it constitutes a mechanism which is known as having positive feed ("à avance mécanique" in French):
- a first pinion 32 which engages with the input pinion 28;
- a second pinion 34 which is arranged above the first pinion 32; and
- a clutch 36 which is capable of connecting the second pinion 34 with the input pinion 28 and with the casing 2 in a selective manner.

The first pinion 32 is fitted on the spindle 4 and is fixedly joined thereto in terms of rotation. The spindle 4 is movable in translation relative to the pinion 32 along the axis A. That connection between the spindle 4 and the first pinion 32 is brought about, for example, owing to splines.

The second pinion 34 comprises an internal thread which cooperates with an external thread of the spindle 4. The second pinion 34 is thereby screwed, in known manner, onto the spindle 4. The second pinion 34 is guided in terms of rotation about the axis A thereof by a needle type cage 35 which is received in the casing 2.

Owing to the helical connection between the spindle 4 and the second pinion 34, the pinion 34 drives the spindle 4 in translation along the axis A in accordance with the relative rotational speed between the second pinion 34 and the spindle 4, that is to say, in accordance with the relative rotational speed between the second pinion 34 and the first pinion 32.

When the spindle 34 is rotated in the clockwise direction, the pitch of the helical connection between the spindle 4 and the second pinion 34 is, in the embodiment illustrated, to the left. In this manner, the advance movement of the spindle 4, that is to say, its movement in translation downwards along the axis A (FIG. 1) is brought about when the rotational speed of the second pinion 34 is greater than the rotational speed of the first pinion 32.

Conversely, the return movement of the spindle 4, that is to say, its movement in terms of rotation upwards along the axis A (FIG. 1) is brought about when the rotational speed of the second pinion 34 is less than the rotational speed of the first pinion 32.

The clutch 36 comprises:
- a rotary engagement pinion 44 which is engaged with the second pinion 34;
- a plurality of first keys 48 which are mounted on the periphery of the rotary engagement pinion 44 and which can be moved relative to the pinion 44 between a position for connecting the pinion 44 to the input pinion 28 and a position for disengaging the pinion 44; and
- a plurality of second keys 50 which are mounted on the periphery of the rotary engagement pinion 44 and which can be moved relative to the pinion 44 between a position for connecting the pinion 44 to the casing 2 and a position for disengaging the pinion 44.

The rotary engagement pinion 44 has an axis B and can rotate only about the axis B relative to the casing 2. The pinion 44 is fixed in terms of translation relative to the casing 2. To that end, the pinion 44 is blocked in terms of translation relative to the casing 2 and is guided purely in rotation about the axis B thereof by two roller bearings 51.

In the connection position of the first keys 48 (FIG. 5), the clutch 36 is in an advance configuration for the spindle 4, the second keys 50 being in a disengagement position. The second pinion 34 is driven at a rotational speed which is greater than that of the first pinion 32. The basic diameters of the pinions 28, 32, 34 and 44 are provided in such a manner that, in the advance configuration of the clutch 36, the second pinion 34 rotates at a speed greater than that of the first pinion 32.

In the connection position of the second keys 50 (FIGS. 1 and 6), the clutch 36 is in a return configuration for the spindle 4, the first keys 48 being in a disengagement position. The second pinion 34 has a rotational speed less than the rotational speed of the first pinion 32. In the embodiment illustrated, the second pinion 34 is fixed in terms of rotation relative to the casing 2 in the return configuration for the spindle 4.

The advance configuration of the clutch 36 therefore corresponds to a configuration in which the second pinion 32 is connected in terms of rotation to the output shaft 24 of the motor 6 whilst the return configuration for the spindle 4 corresponds to a configuration in which the second pinion 34 is fixed in terms of rotation relative to the casing 2.

In order to move the keys 48 and 50, the clutch 36 comprises a push-member 52 which can be moved between an advance position, in which the push-member 52 maintains the first keys 48 in the connection position thereof and disengages the second keys 50, and a return position in which the push-member 52 maintains the second keys 50 in the connection position thereof and disengages the first keys 48.

The push-member 52 is received in translation inside the rotary pinion 44 along the axis B between the advance position and the return position thereof and is controlled by a movement actuator 54.

The push-member 52 is a rod which comprises a widened portion 56 and two narrow portions 58 at one side and the other of the widened portion 56 along the axis B. The push-member 52 thereby forms, at the junctions between the widened portion 56 and the narrow portions 58, two cam surfaces 60 and 62 (see FIGS. 1 and 4 to 7) for moving the first keys 48 and the second keys 50, respectively.

Figure 4:
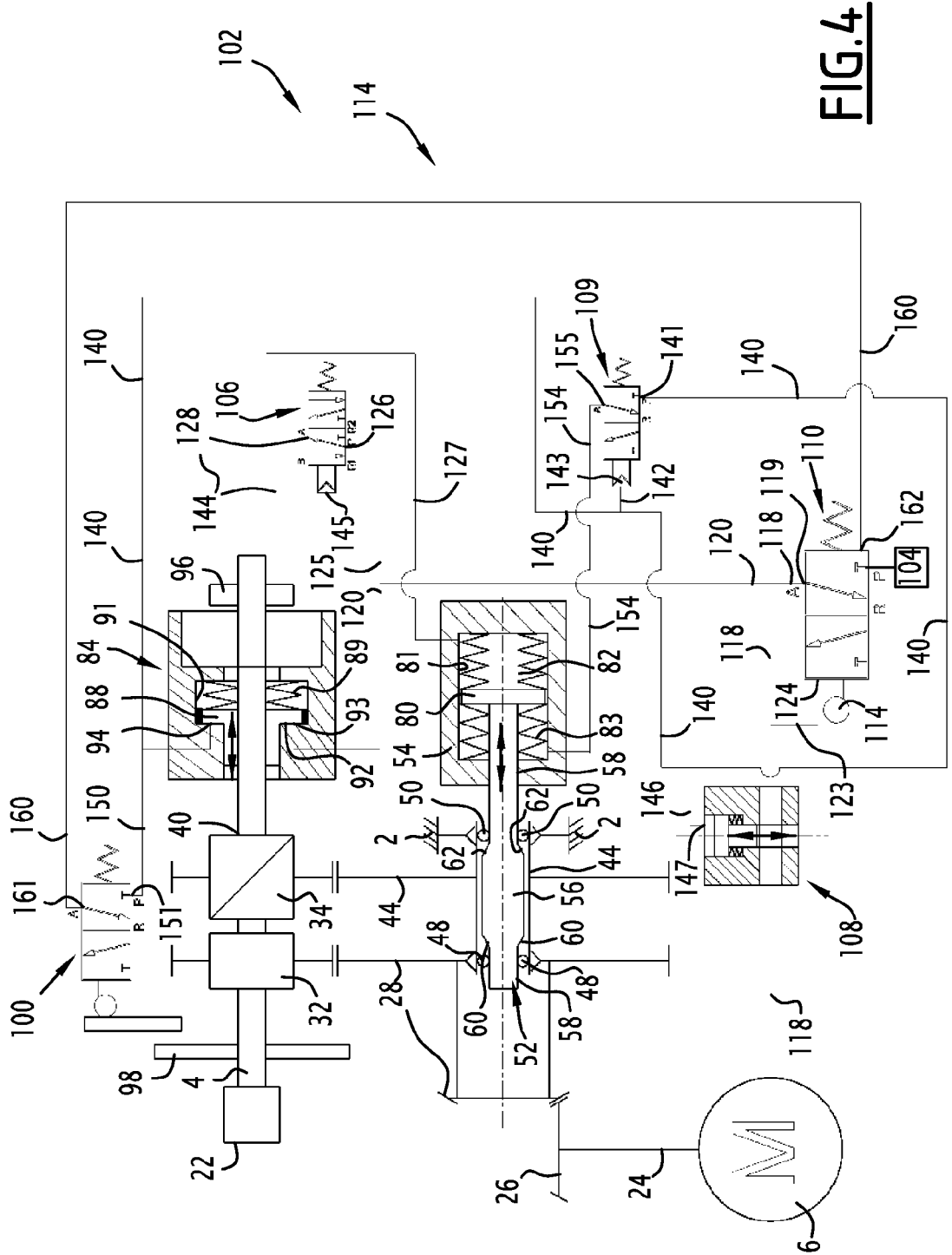
FIG. 4 is a schematic view illustrating a portion of the pneumatic control circuit of the machine of FIG. 1.
Figure 5:
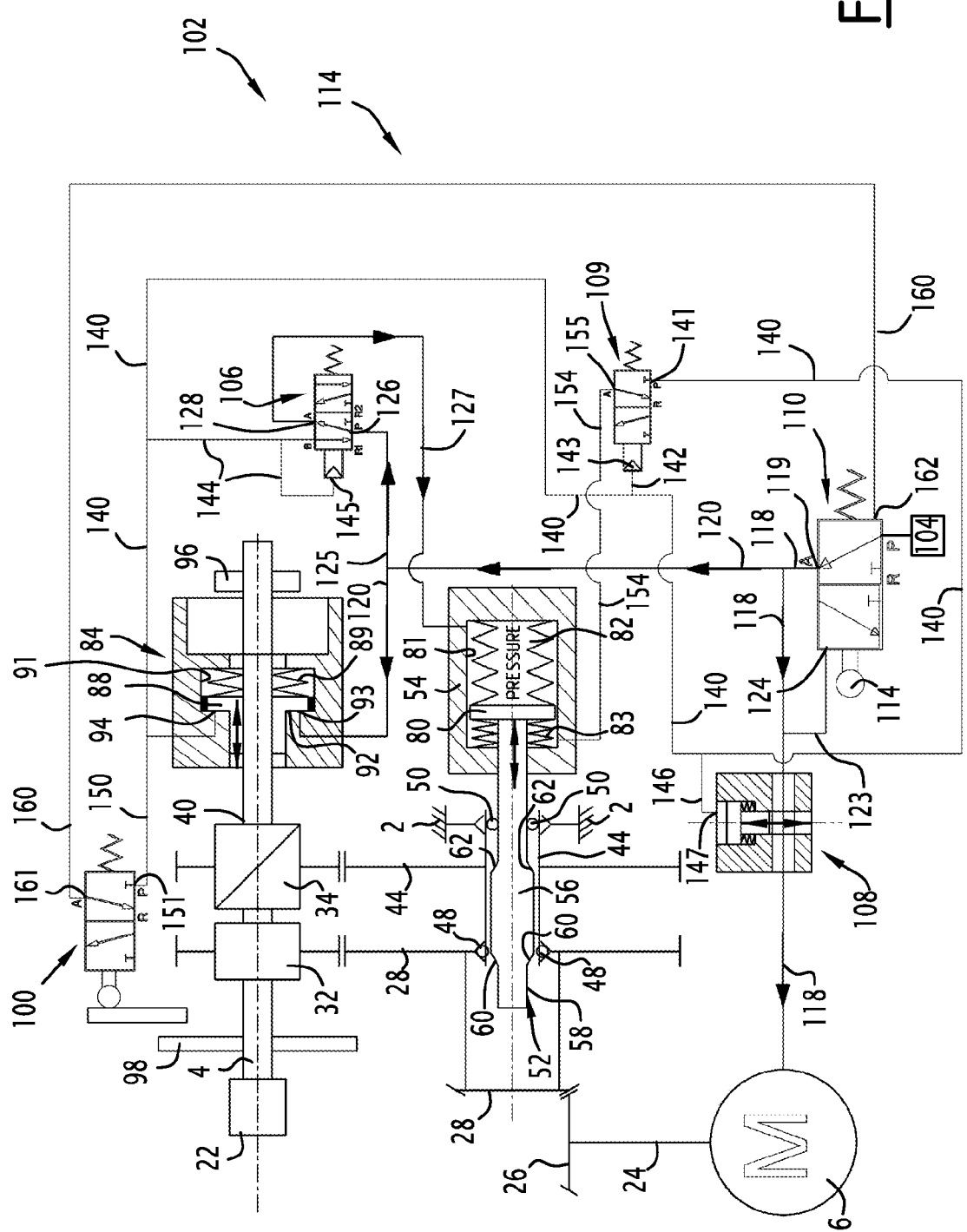
FIGS. 5, 6 and 7 are views similar to FIG. 4 illustrating subsequent steps for controlling the machine of FIG. 1.

When the push-member 52 moves as far as its advance position, the cam surface 60 moves the first keys 48 from the disengagement position thereof (FIG. 4) towards and as far as the connection position thereof (FIG. 5).

Figure 2:
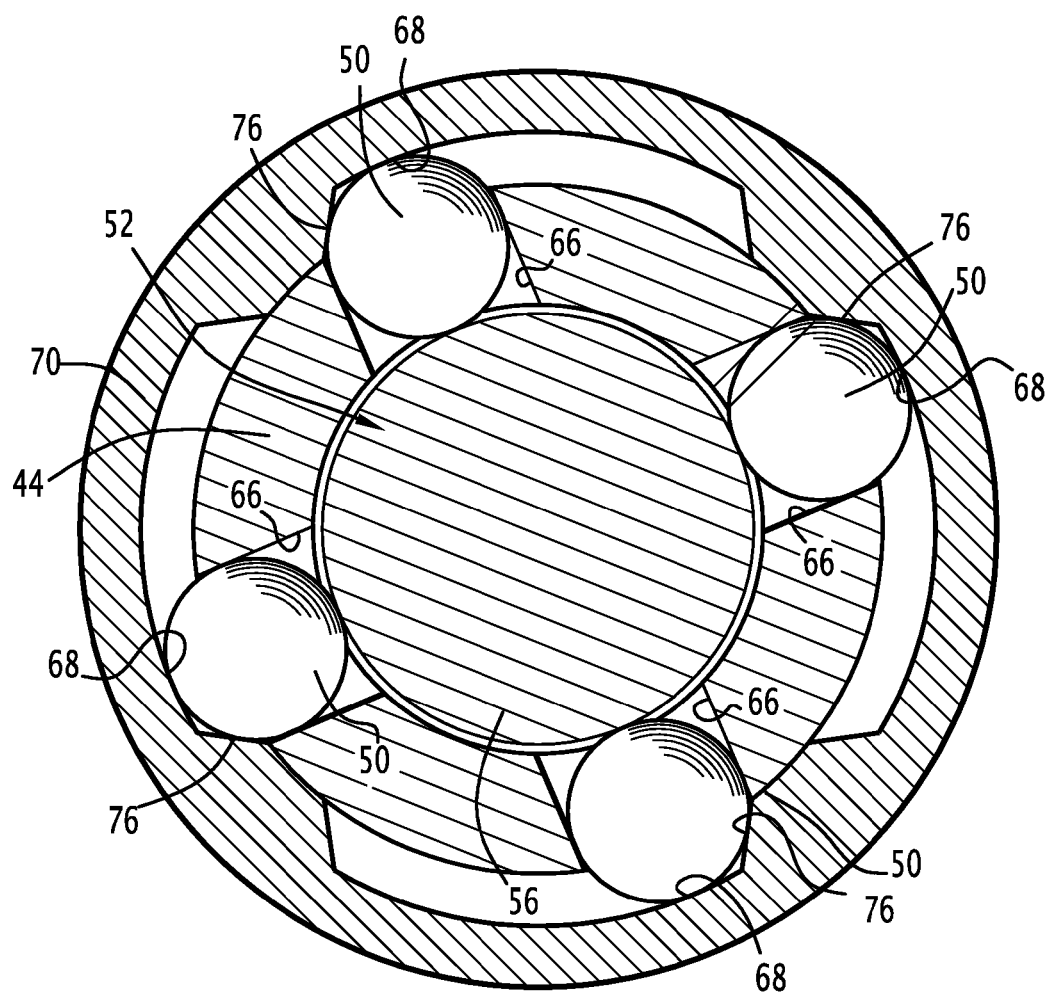
FIG. 2 is an enlarged schematic section along the line II of FIG. 1, illustrating the clutch of the drive mechanism of the spindle of the machine of FIG. 1.
Figure 3:
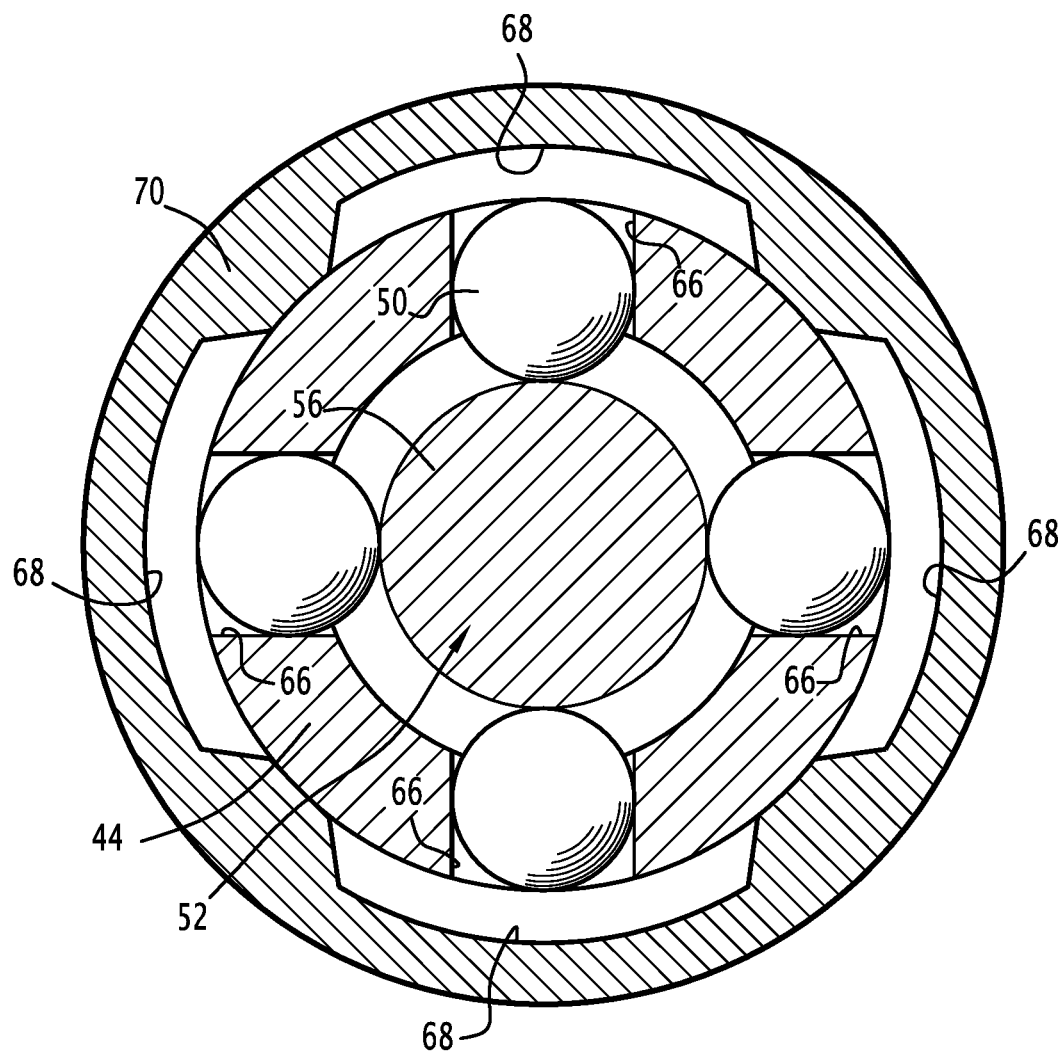
FIG. 3 is a view similar to FIG. 2 in another configuration of the clutch.
Figure 6:
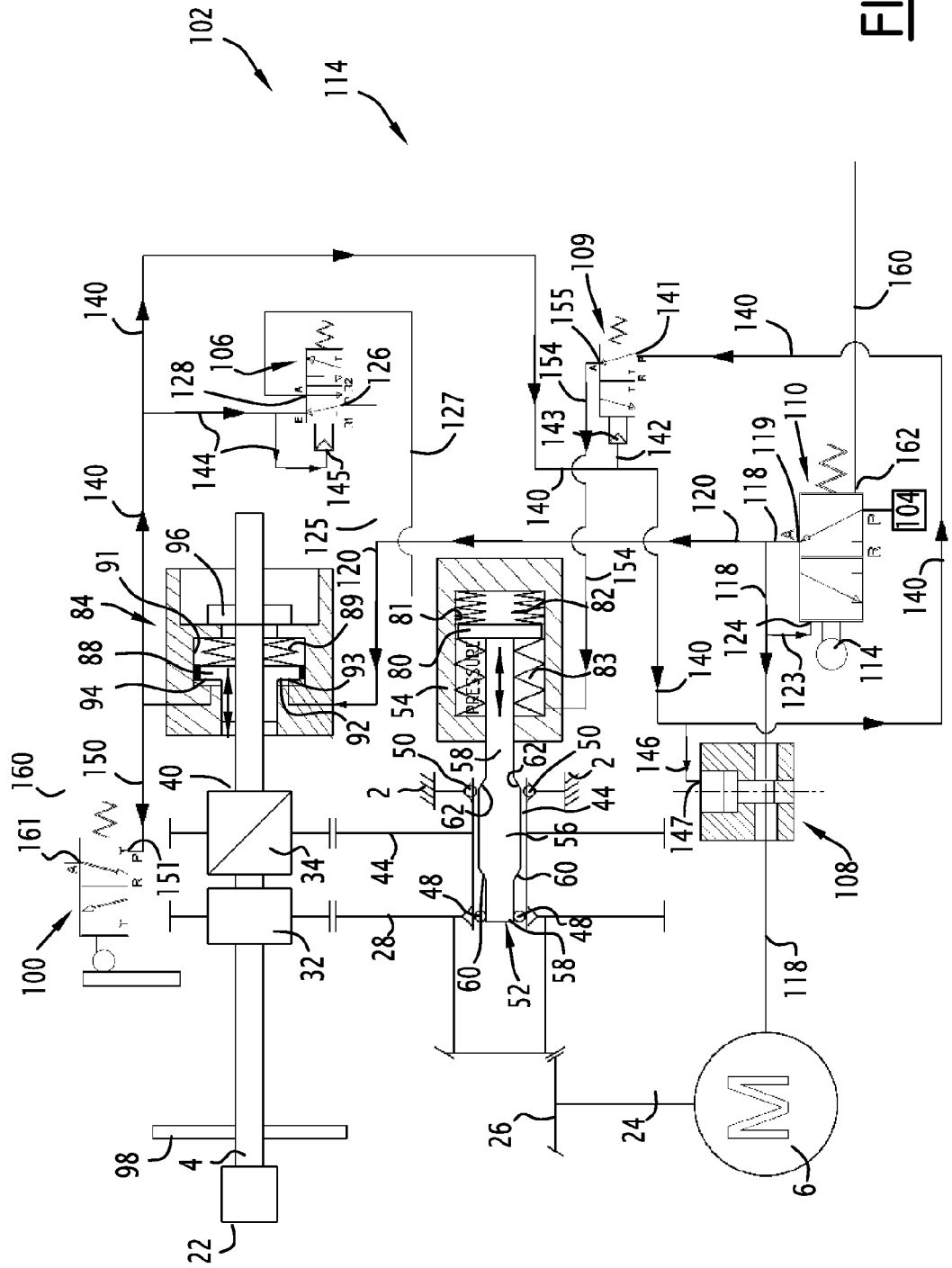
Figure 7:
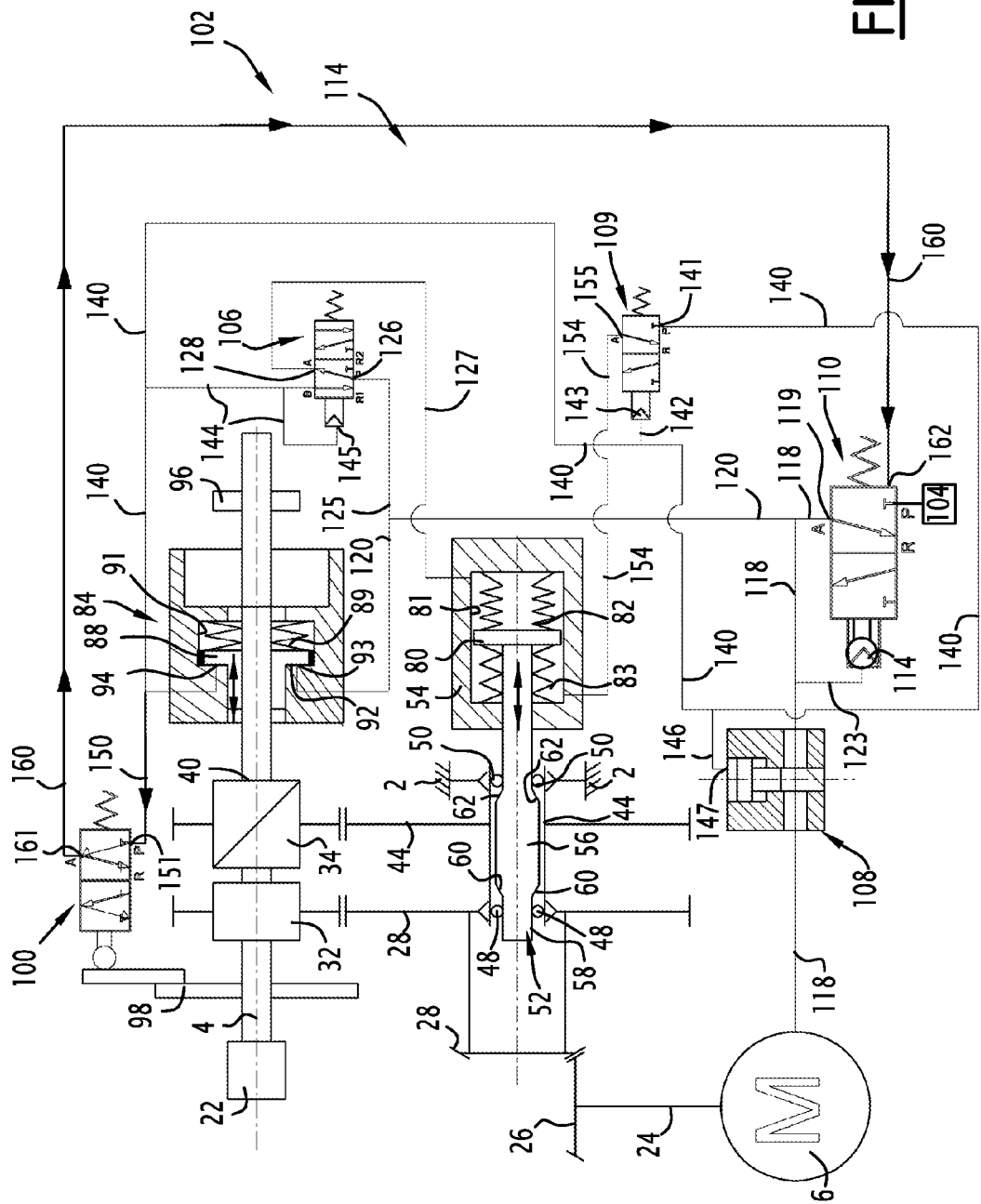

When the push-member 52 is moved as far as its return position (illustrated in FIG. 1), the cam surface 62 moves the second keys 50 from the disengagement position thereof (FIGS. 3 to 5 and 7) towards and as far as the connection position thereof (FIGS. 1, 2 and 6).

The surface of the widened portion 56 selectively maintains the keys 48 and 50 in the connection position thereof.

The keys 48 and 50 are, in the embodiment illustrated, balls which are arranged circumferentially around the push-member 52, in two rows, spaced along the axis B.

Each key 48, 50 is received in a respective radial hole 66 (FIGS. 2 and 3) of the rotary pinion 44 in such a manner that each key 48, 50 is radially movable relative to the axis B of the rotary pinion 44 between the connection position and the disengagement position thereof and is fixedly joined in terms of rotation to the pinion 44 about the axis B thereof.

The keys 48 and 50 are, in the embodiment illustrated, angularly spaced from each other by approximately 90°.

Each second key 50 cooperates, in the connection position thereof, with a blocking recess 68 (FIGS. 2 and 3) which is provided in a return connection ring 70 which has an axis B and which is fixed to the casing 2.

In the same manner, each first key 48 cooperates, in its connection position, with a rotation blocking recess 68 which is provided in an advance connection ring 74 (FIG. 1) which has an axis B and which is fixed to the input pinion 28. The recesses 68 are provided radially in rings 70 and 74 and have surfaces 76 for blocking the rotation of the keys 48 and 50 about the axis B. The blocking surfaces 76 also form cam surfaces which are capable of moving the keys 48 and 50 from the connection position thereof towards and as far as the disengagement position thereof when they are disengaged by the push-button 52, respectively.

In the embodiment illustrated, the movement actuator 54 (FIGS. 1 and 4 to 7) of the push-member 52 is a double-action pneumatic actuator which comprises a piston 80 which is movable in a cylinder 81. The piston 80 and the cylinder 81 together delimit, at one side and the other of the piston 80, an advance chamber 82 and a return chamber 83. The volume increase of the advance chamber 82 corresponds to movement of the push-member 52 towards the advance position thereof whilst the volume increase of the return chamber 83 corresponds to movement of the push-member 52 towards the return position thereof.

The piston 80 is resiliently urged towards an intermediate position, in which the push-member 52 is between its advance position and its return position. In that intermediate position, the first keys 48 and the second keys 50 are disengaged.

The drive mechanism 12 further comprises a mechanism 84 (FIG. 1) for axial abutment against the second drive pinion 34. The mechanism 84 comprises a piston 88 which is positioned above the second pinion 34 and two resilient axial abutment rings 89 which push the piston 88 towards the second pinion 34. The rings 89 are wedged between the casing 2 and the piston 88. The rings 89 are indicated by a spring in FIGS. 4 to 7. The piston 88 is fixed in terms of rotation and the abutment mechanism 84 comprises a roller bearing 90 which allows relative rotation of the pinion 34 and the piston 88.

The piston 88 is movable in terms of translation in a cylinder 91 (FIGS. 4 to 7) and delimits, with the cylinder 91 and the spindle 4, a chamber 92 for detecting the end of advance travel communicating with input holes 93 and output holes 94. The piston 88 is movable between a normal operating position, in which the input holes 93 and output holes 94 of the chamber 92 are blocked by the piston 88 and a position for detecting the end of advance travel of the spindle 4, in which the holes 93 and 94 are free.

In order to limit the travel of the movement of the spindle 4 along the axis A, the spindle 4 comprises an advance travel end stop 96 and a return travel end stop 98.

The advance travel end stop 96 guides the spindle 4 in rotation about the axis A and in translation along the axis A. The stop 96 is fixed in terms of translation along the axis A relative to the spindle 4.

At the end of the advance travel of the spindle 4, the stop 96 blocks translation of the spindle 4 along the axis A thereof. The second pinion 34 is then screwed upwards (FIG. 1) and raises the abutment piston 88 in such a manner that the piston 88 is in its position for detection and the end of the advance travel of the spindle 4 is detected. In this manner, the piston 88 forms a unit for detecting the end of advance travel.

When the spindle 4 arrives at the end of return travel, the stop 98 moves into abutment against a pneumatic valve 100 for detecting the end of return travel.

As illustrated in FIGS. 4 to 7, the machine 1 further comprises a pneumatic control device 102 comprising:
  a source 104 of pressurised air;
  the actuator 54 for moving the push-member 52;
  the piston 88 which detects the end of advance travel of the spindle 4;
  the valve 100 for detecting the end of return travel and which is controlled by contact with the stop 98;
  a valve 106 for bringing about advance movement in order to move the actuator 54 into the advance configuration thereof;
  a valve 108 for reducing the supply flow of the motor 6;
  a valve 109 for bringing about return movement in order to move the actuator 54 into the return configuration thereof; and
  a supply valve 110 which brings about the supply of the assembly of the control device 102 and which is controlled, in the embodiment illustrated, for opening movement by a start button 114 and, for closure movement, by the valve 100 for detecting the end of return travel, and which is capable of detecting a pressure reduction in order to stop the machine 1.

The valve 100 for detecting the end of return travel is, for example, a three-way, two-position distributor. One position is a normal operating position, in which the valve 100 is closed and towards which the valve 100 is resiliently returned, and the other position is a position for bringing about the closure of the supply valve 110, towards which position the valve 100 is moved by the return travel end stop 98.

The advance control valve 106 is, for example, a five-way, two-position distributor. The two positions are an advance control position, in which the valve 106 supplies the advance chamber 82, and an inactive position, in which the valve 106 is closed. The valve 106 is resiliently returned towards its advance control position. The valve 106 is pneumatically controlled towards its inactive position by the movement of the piston 88 into the position thereof for detecting the end of advance travel.

The valve 108 for reducing the supply flow of the motor 6 is, for example, a three-way, two-position valve. One position is an open position for supplying the motor 6 and the other position is a position for reducing the supply flow. The valve 108 is resiliently returned towards its open position and is pneumatically controlled towards its flow reduction position by the movement of the piston 88 into the position thereof for detecting the end of advance travel.

The return control valve 109 is a three-way, two-position distributor, one position of which is a return control position in which the valve 109 supplies the return chamber 83, and the other position is an inactive position in which the valve 109 is closed. The valve 109 is resiliently returned towards its inactive position. The valve 109 is pneumatically controlled in the direction towards its return control position by the movement of the piston 88 into the position thereof for detecting the end of advance travel.

The supply valve 110 is a three-way, two-position distributor, comprising a position for operation of the machine 1, and a position for stoppage of the machine 1. The valve 110 is resiliently returned towards its stop position. It is moved into its operating position by moving the start button 114 and is maintained in its operating position by a pneumatic security retrocontrol unit which is capable of detecting a decrease in pressure and of allowing movement of the valve 110 into its stop position when the pressure decreases. The valve 110 is further controlled pneumatically into its stop position by changing the valve 100 for detecting the end of return travel into its closure control position.

The control device 102 comprises a pneumatic circuit 114 which connects the air source 104, the supply valve 110, the motor 6, the movement actuator 54, the piston 88, the valve 100 for detecting the end of return travel, the valve 106 for controlling advance movement, the valve 108 for reducing the supply flow and the return control valve 109.

In this manner, the pneumatic circuit 114 comprises:

a supply conduit 118 which connects an output hole 119 of the supply valve 110 to the motor 6, the flow reduction valve 108 partially blocking the supply conduit 118 in the position thereof for reducing the supply flow of the motor 6;

a conduit 120 which is tapped from the conduit 118 between the valves 108 and 110 and which is connected to the input hole 93 of the chamber 92 for detecting the end of advance travel which is delimited by the piston 88, the valve 110 in its operating position supplying the chamber 92 via the conduit 120;

a conduit 123 which is tapped from the conduit 118 between the valves 108 and 110 and which is connected to a security hole 124 for retrocontrol of the valve 110 in order to maintain the valve 110 in the operating position thereof if the pressure upstream of the valve 110 is greater than a threshold value;

a conduit 125 which is tapped from the conduit 120 between the valve 110 and the input hole 93 of the chamber 92 and which is connected to an input hole 126 of the advance control valve 106, the valve 110 in its operating position supplying the valve 106 via the conduit 125;

a conduit 127 which connects an output hole 128 of the advance control valve 106 to the advance chamber 82 of the actuator 54, the valve 106 in its advance control position supplying the chamber 82 via the conduit 127;

a conduit 140 which connects the output hole 94 of the chamber 92 to an input hole 141 of the return control valve 109 so as to supply the valve 109 when the piston 88 is in its position for detecting the end of advance travel;

a conduit 142 which is tapped from the conduit 140 between the holes 94 and 141 and which is connected to an actuation hole 143 of the valve 109 so as to move the return control valve 109 into its return control position when the piston 88 is in its position for detecting the end of advance travel;

a conduit 144 which is tapped from the conduit 140 between the output hole 94 and the tapping of the conduit 142, the conduit 144 being connected to an actuation hole 145 of the advance control valve 106 so as to move the advance control valve 106 into its inactive position when the piston 88 is in its position for detecting the end of advance travel, and before moving the return control valve 109 into its return position;

a conduit 146 which is tapped from the conduit 140 between the tapping of the conduit 142 and the input hole 141 of the valve 109, the conduit 146 being connected to an actuation hole 147 of the flow reduction valve 108, so as to move the valve 108 into its position for reducing the supply flow of the motor 6 when the piston 88 is in its position for detecting the end of advance travel and before supplying the return control valve 109;

a conduit 150 which is tapped from the conduit 140 and which is connected to an input hole 151 of the valve 100 for detecting the end of return travel so as to supply the valve 100 when the piston 88 is in its detection position, the conduit 150 being, in the embodiment illustrated, tapped between the output hole 94 and the tapping of the conduit 144 of the advance control valve 106;

a conduit 154 which connects an output hole 155 of the return control valve 109 to the return chamber 83 of the actuator 54 so as to supply the return chamber 83 when the return valve 109 is in its return position; and a conduit 160 which connects an output hole 161 of the valve 100 for detecting the end of return travel to an actuation hole 162 of the supply valve 110 so as to move the supply valve 110 into its stop position when the valve 100 for detecting the end of return travel is in its position for bringing about closure of the valve 110.

The steps for controlling the machine 1 will now be described with reference to FIGS. 4 to 7.

The diagram of FIG. 4 illustrates the machine 1 in the stopped state. The supply valve 110 is closed and does not supply the pneumatic control circuit 114. The push-member 52 is in its intermediate position.

In the configuration of FIG. 5, the button 114 for starting the supply valve 110 has been pressed.

The air source 104 is then connected by the conduit 118 to the motor 6, passing via the flow reduction valve 108 in its open position in such a manner that the motor 6 is supplied.

Since the piston 88 is in its position for blocking the holes 93 and 94, air cannot be introduced into the chamber 92 and cannot be discharged from the chamber 92, in such a manner that the downstream conduits 140, 142, 144, 146, 150, 154 and 160 are not supplied.

On the other hand, the advance control valve 106 is in its position for controlling advance and connects the conduit 125 to the conduit 127 in such a manner that the advance chamber 82 of the actuator 54 is supplied by the air source 104. Consequently, the movement actuator 54 is moved into its advance configuration.

The clutch 36 is in its advance configuration. The motor 6 drives the first pinion 32 and the second pinion 34 in such a manner that the spindle 4 advances in translation along its axis A.

The FIG. 6 illustrates the spindle 4 at the end of advance travel. The stop 96 blocks the translation of the spindle 4 forwards. The rotation of the spindle 4 lifts the second pinion 34 and thereby moves the piston 88 into its position for detecting the end of advance travel.

In the detection position of the piston 88, the input holes 93 and output holes 94 of the chamber 92 are disengaged, the chamber 92 is supplied and the downstream conduits 140, 142, 144, 146, 150 are supplied.

The motor 6 is still supplied by the air source 104.

The actuation hole 145 of the advance control valve 106 is supplied by the conduit 144 and the valve 106 is moved into its inactive position. In its inactive position, the valve 106 no longer supplies the advance chamber 82 of the actuator 80 and the push-member 52 moves into its intermediate position.

Subsequently, the actuation hole 143 of the return control valve 109 is supplied. The valve 109 is then moved into its return control position.

Subsequently, the actuation hole 147 of the flow reduction valve 108 is supplied. The valve 108 is then moved into its flow reduction position.

Subsequently, the input hole 141 of the return control valve 109 is supplied. In the return control position of the valve 109, the conduit 154 is supplied and the return control valve 109 supplies the return chamber 83 of the actuator 54. The push-member 52 moves into its return position.

When the piston 88 is moved into its advance detection position, air arrives in the conduit 140.

Owing to the length of the conduits 142, 144, 146 which are tapped and their respective tapping position with respect to the conduit 140, the air arrives successively at the actuation hole 145, then at the actuation hole 143, then at the actuation hole 147 and finally at the input hole 141.

Consequently, when the piston 88 is moved into its position for detecting the end of advance travel, the advance control valve 106 is first moved into its inactive position.

The return control valve 109 is subsequently further moved into its return control position.

The flow reduction valve 108 is subsequently further moved into its position for partially blocking the supply conduit 118 of the motor 6 in such a manner that the rotational speed of the motor 6 is reduced.

The return control valve 109 is subsequently further supplied.

The movement actuator 54 is subsequently further moved into its return configuration and the push-member 52 into its return position. The clutch 36 is then in its return configuration.

The motor 6 is still connected to the first pinion 32 and drives the spindle 4 in rotation, but is no longer connected to the second pinion 34.

The second pinion 34 is fixed in terms of rotation about the axis B thereof and thereby drives the spindle 4 in translation along the axis A thereof in a rapid return movement.

When the return travel end stop 98 arrives in contact with the valve 100 for detecting the end of return travel, the valve 100 supplies the actuation conduit 160 (FIG. 7) and moves the supply valve 110 into its stop position. The motor 6 is no longer supplied and the machine 1 is stopped.

The clutch mechanism 36 is robust and the machine 1 is reliable.

The keys 48 and 50 can be moved very rapidly by the push-member 52 in such a manner that they have a large engagement surface with the surfaces of the recesses 68. The keys 48 and 50 are further fitted to the pinion 44 and are consequently stronger than, for example, positive clutches whose teeth are machined.

The fixing of the rotary engagement pinion 44 in terms of translation relative to the casing 2 also contributes to the strength of the clutch 36. The vibrations of the rotary pinion 44 are thereby limited. However, such a characteristic may not be provided in some variants.

The clutch 36 is further simple. It has a relatively low production cost.

The clutch 36 also has a reduced spatial requirement. The provision of the push-member 52 inside the rotary pinion 44 contributes to a reduction in this spatial requirement, as does the limited number of clutch components. The drive mechanism 12 comprises only four pinions 28, 32, 34, 44 and the clutch 36 is constructed by means of a single pinion 44.

The speed reduction of the motor 6 before the return of the spindle 4 contributes to the reliability of the machine 1.

The drive mechanism 12 and the clutch 36 are thereby less loaded when the clutch 36 changes from its advance configuration to its return configuration.

The pneumatic control device 102 and the pneumatic motor 6 have the advantage over an electric device of reduced spatial requirement and reduced weight. In a variant, however, the motor 6, the control device 102, the actuator 54 for moving the push-member 52, the units for detecting the end of advance travel and return of the spindle 4 can be individually or even all electrical members.

The electrical control device comprises a control unit which comprises a store, in which there are stored programmes for controlling the drive motor which are adapted in order to ensure a reduction in speed of the motor 6 before the spindle 4 returns.

In a variant, the clutch 36 has only one first key 48 and/or only one second key 50.

The invention claimed is:

1. A processing machine, comprising:
   a casing;
   a tool-holder spindle which extends along a first axis;
   a drive motor for driving the tool-holder spindle; and
   a drive mechanism which is for the tool-holder spindle and which mechanically connects the drive motor to the tool-holder spindle, the drive mechanism comprising:
   a first drive member for rotating the spindle about the first axis thereof relative to the casing;
   a second drive member for driving the spindle in translation along the first axis thereof relative to the casing, the second drive member being screwed onto a threaded portion of the spindle in such a manner that the spindle advances or returns along the first axis thereof in accordance with the relative rotational speed between the first drive member and the second drive member; and a clutch which has a return configuration for the spindle, in which the second drive member and the drive motor are disengaged, and an advance configuration for the spindle, in which the second drive member and the drive motor are engaged, wherein the clutch comprises:

a rotary engagement member which is connected in terms of rotation to the second drive member, the rotary engagement member being movable in terms of rotation about a second axis relative to the casing;

at least a first key which is movable relative to the rotary engagement member between a first position for connecting the rotary engagement member to the drive motor and a second position for disengaging the rotary engagement member; and at least a second key which is movable relative to the rotary engagement member between a third position for connecting the rotary engagement member to the casing and a fourth position for disengaging the rotary engagement member, the first key being in the first position and the second key being in the fourth position when the clutch is in the advance configuration for the spindle, the first key being in the second position and the second key being in the third position when the clutch is in the return configuration for the spindle.

2. The processing machine according to claim 1, wherein the first key and/or the second key are/is fixedly joined to the rotary engagement member in terms of rotation.

3. The processing machine according to claim 1 or claim 2, wherein the first key and/or the second key are/is radially movable relative to the second axis between the first position and/or the third position and the second position and/or the fourth position thereof.

4. The processing machine according to claim 1, wherein the rotary engagement member is fixedly mounted in terms of translation relative to the casing along the second axis thereof.

5. The processing machine according to claim 1, wherein the second drive member is a first pinion, the rotary engagement member being a second pinion which is engaged with the second drive member, the drive mechanism comprising an input pinion which is engaged with an output pinion of the drive motor, the rotary engagement member being connected to the input pinion when the clutch is in the advance configuration thereof.

6. The processing machine according to claim 5, wherein the first drive member is a third pinion which is engaged with the input pinion.

7. The processing machine according to claim 1, wherein the clutch comprises a push-member which is movable between an advance position, in which the push-member maintains the first key in the first position thereof and disengages the second key, and a return position in which the push-member maintains the second key in the third position thereof and disengages the first key.

8. The processing machine according to claim 1, wherein the first key and/or the second key are/is balls/a ball which are/is received in a hole of the rotary engagement member.

9. The processing machine according to claim 1, further comprising a device for controlling the drive motor and the clutch.

10. The processing machine according to claim 9, wherein the control device comprises a unit for detecting an end of advance travel of the spindle, the control device moving the clutch into the return configuration thereof when the end of advance travel of the spindle is detected.

11. The processing machine according to claim 10, wherein the control device brings about a reduction in the rotational speed of the drive motor when the end of advance travel of the spindle is detected.

12. The processing machine according to claim 9, wherein the control device is pneumatic, and wherein the drive motor is pneumatic.

13. The processing machine according to claim 12, wherein the clutch comprises a push-member which is movable between an advance position, in which the push-member maintains the first key in the first position thereof and disengages the second key, and a return position in which the push-member maintains the second key in the third position thereof and disengages the first key and wherein the control device comprises a pneumatic actuator for moving the push-member between the advance position and the return position thereof.

14. The processing machine according to claim 12, wherein the control device comprises a pneumatic valve for reducing a supply flow of the drive motor.

15. The processing machine according to claim 14, wherein the control device comprises a pneumatic circuit for controlling the pneumatic valve and a movement actuator, the pneumatic circuit supplying the flow reduction valve upstream of the movement actuator in such a manner that the control device brings about a reduction in the supply flow of the drive motor before actuating a movement of the push-member as far as the return position thereof.

16. A method for operating a processing machine comprising a casing, a tool-holder spindle which extends along a first axis, a drive motor, and a drive mechanism, wherein the drive mechanism comprises:

a first drive member for rotating the spindle about the first axis thereof relative to the casing;

a second drive member for driving the spindle in translation along the first axis thereof relative to the casing, the second drive member being screwed onto a threaded portion of the spindle; and a clutch that comprises:

a rotary engagement member which is connected in terms of rotation to the second drive member, the rotary engagement member being movable in terms of rotation about a second axis relative to the casing;

at least a first key which is movable relative to the rotary engagement member between a first position for connecting the rotary engagement member to the drive motor and a second position for disengaging the first key; and at least a second key which is movable relative to the rotary engagement member between a third position for connecting the rotary engagement member to the casing and a fourth position for disengaging the rotary engagement member;

the method comprising the steps of:

driving the first drive member for rotating the spindle about the first axis thereof relative to the casing;

moving the first key to the first position for connecting the rotary engagement member to the drive motor and thereby driving the spindle in translation along the first axis thereof relative to the casing in accordance with the relative rotational speed between the first drive member and the second drive member;

detecting an end of advance travel of the spindle;

reducing a rotational speed of the spindle about the first axis;

moving the first key in a second direction relative to the rotary engagement member to the second position; and moving the second key to the third position relative to the rotary engagement member.

17. The method according to claim 16, wherein a rotational speed of the spindle is greater than or equal to 6,000 revolutions per minute.

18. The method according to claim 16, wherein a rotational speed of the spindle is greater than or equal to 8,000 revolutions per minute.

19. The method according to claim 16, wherein a rotational speed of the spindle is greater than or equal to 12,000 revolutions per minute.

20. The method according to claim 16, wherein a rotational speed of the spindle is greater than or equal to 14,000 revolutions per minute.

21. The method according to claim 16, wherein a rotational speed of the spindle is greater than or equal to 15,000 revolutions per minute.

* * * * *